INVENTORS.
Paul L. Born
Daniel V. Meiller
BY Brown, Jackson, Boettcher & Diemer
Attys.

Patented Mar. 17, 1953

2,631,604

UNITED STATES PATENT OFFICE 2,631,604

GAS SHUTOFF VALVE

Paul L. Born, Wilmette, and Daniel V. Meiller, Maywood, Ill.

Application May 28, 1948, Serial No. 29,686

13 Claims. (Cl. 137—466)

This invention relates, generally, to gas shut-off valves, and it has particular relation to automatically operating valves for this purpose.

The distribution of gas for industrial and domestic uses contemplates the continuous availability of the gas supply at required pressure. However, it is sometimes the case that the pressure is reduced below that necessary for operation of gas using equipment or that the supply may be completely interrupted. These failures of the gas supply are caused by various circumstances such as actual interruption of the gas supply system which results in complete loss of gas pressure or the overloading of the system which may cause the pressure to drop below that which is required for maintaining gas consuming devices in operation. When such conditions exist, the flames normally fed by the system are extinguished and the burners must be lighted when the system is restored to normal operation.

In many instances the burners will not be shut off when their flames are extinguished due to the failure of the gas supply or reduction in the gas pressure sufficient to cause this to take place. Thus, when the pressure is restored, there is the likelihood that the gas will escape unburned through the unlighted burners. This is a condition that it is desirable to avoid and it is to the taking care of which that this invention is particularly addressed.

Accordingly, among the objects of this invention are: To close a valve in a gas supply line automatically in response to decrease in the gas pressure to a predetermined pressure; to prevent the valve from opening automatically in response to the re-establishment of normal gas pressure; to hold the valve open so long as normal gas pressure is maintained; to hold the valve closed once it has closed automatically as a result of failure of gas pressure by the normal gas pressure when the same is restored; to reset the valve to the open position by manually operable means; to seal the manually operable reset means so as to prevent escape of gas therepast; to incorporate an automatic gas shut-off valve having the foregoing characteristics in the housing of a gas meter; and to bring the gas into and take it away from the housing of the gas valve at various locations.

Other objects of this invention will, in part, be obvious and in part appear hereinafter.

This invention is disclosed in the embodiments thereof shown in the accompanying drawings and it comprises the features of construction, combination of elements, and arrangement of parts which will be exemplified in the constructions hereinafter set forth and the scope of the application of which will be indicated in the appended claims.

For a more complete understanding of the nature and scope of this invention reference can be had to the following detailed description, taken together with the accompanying drawings, in which.

Figure 1:
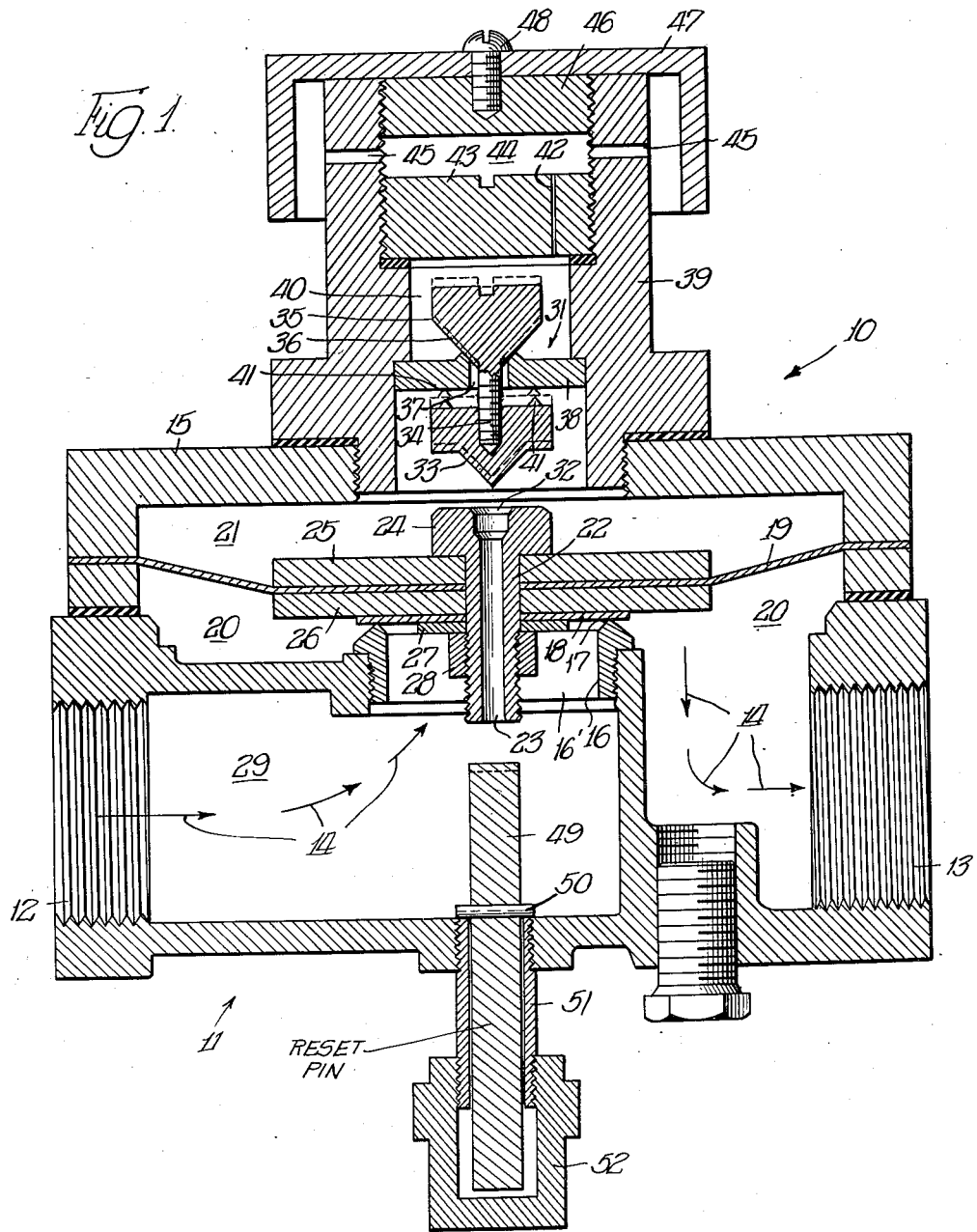
Figure 1 is a longitudinal vertical sectional view through an automatic gas shut-off valve constructed in accordance with this invention.

Referring now particularly to Figure 1 of the drawings, it will be observed that the reference character 10 designates, generally, an automatic gas shut-off valve in which the present invention is embodied. The valve 10 is arranged to be connected in a gas line such as the supply pipe extending to an industrial or domestic user. It includes a valve housing that is indicated, generally, at 11 which has a threaded inlet 12 and a threaded outlet 13 through which the gas flows normally as indicated by the arrows 14. A bridge member 15 extends across the upper portion of the housing 11 for a purpose which will be set forth presently. Within the housing 11 there is provided a cylindrical valve seat fitting 16 which has an opening 16' therethrough which is cylindrical and the axis of which is vertical. At the upper end of the valve seat fitting 16 there is a main valve seat 17 which is formed by shaping the fitting 16 so as to provide an upwardly facing circular edge at the juncture of two conical surfaces which intersect at right angles. A main valve member or disc 18 of synthetic rubber or the like is arranged to engage the main valve seat 17 and to close off the opening 16' so as to prevent the flow of gas as indicated by the arrows 14 under certain conditions.

The main valve member or disc 18 is carried by a diaphragm 19 whose edges are anchored to the bridge member 15. It will be observed that the diaphragm 19 extends horizontally and that it separates the interior of the valve housing 11 into a main space 20 and an auxiliary space 21; the main space 20 being located below the diaphragm 19 and the auxiliary space 21 being located above it. It is pointed out here that the area of the main valve member or disc 18 to which the gas pressure in the housing 11 is applied is relatively small as compared to the area of the upper surface of the diaphragm 19 to which gas pressure also is applied under certain circumstances for holding the diaphragm 19 and the main valve member or disc 18 in the closed position shown in Figure 1.

With a view to holding the main valve member or disc 18 in position on the underside of the diaphragm 19 a hollow center bolt 22 extends therethrough and, as shown, it has a central opening or passageway 23. The bolt 22 also has a head 24. It extends through large diameter washers 25 and 26 which are located on opposite sides of the diaphragm 19 and serve as weights to bias the same downwardly under the influence of gravity. A relatively small diameter washer 27 bears against the underside of the main valve member or disc 18 and a nut 28 is threaded on the lower end of the bolt 22 for holding the parts just described in assembled relation on opposite sides of the diaphragm 19.

When the diaphragm 19 and the main valve member or disc 18 occupy the positions shown in Figure 1, the main space 20 below the diaphragm 19 is separated from the inlet space 29. This relationship is important since it permits the application of the restored gas pressure to the upper side of the diaphragm 19 and prevents reopening of the main valve member or disc 18 when the gas pressure is restored after failure thereof.

With a view to preventing the automatic opening of the main valve member or disc 18 on restoration of gas pressure once it has been closed automatically as a result of failure thereof, a double seated control valve, shown generally at 31, is provided. The control valve 31 is shown in full lines in Figure 1 of the drawings in the lower position into which it moves when the main valve member 18 and the diaphragm 19 move downwardly automatically to the main valve closing position, as a result of failure of gas pressure. We have illustrated in dotted lines the upper position into which this control valve 31 moves when the main valve 18 and diaphragm 19 have been restored to their normal raised positions by the performance of the manual restoring operation, as will be later described.

The double seated control valve 31 includes a lower seat 32 which, as shown, is located at the upper end of the passageway 23 in the head 24 of the bolt 22. A conical valve member 33 is arranged to engage the lower valve seat 32 for closing off the upper end of the passageway 23. This action takes place when gas normally flows as indicated by the arrows 14 through the valve housing 11 and the lower seat 32 is held against the conical valve member 33 which then occupies the raised position shown in dotted lines in Figure 1 of the drawings.

A stud 34 is threaded into the conical valve member 33, as shown, and it extends from an upper conical valve member 35 which is arranged to engage an upper seat 36. It will be observed that the stud 34 extends through a vent or passageway 37 in a plate 38 that is soldered or otherwise secured in a control valve housing 39 which, as shown, opens at its lower end into the auxiliary space 21 above the diaphragm 19. When the control valve 31 is in the raised position shown in dotted lines in Figure 1, the space 40 within the valve housing 39 is in communication with the auxiliary space 21 through the vent or passageway 37. This is permitted since the conical valve member 33 is spaced slightly from the underside of the plate 38 by projections 41. It will be understood that the valve members 33 and 35 are rigidly attached to each other in the construction just described and that they move conjointly so that either the passageway 23 is closed by the valve member 33, or else the vent passageway 37 is closed by the valve member 35, depending upon the particular operating conditions.

The space 40 in the control valve housing 39 is vented to the atmosphere through an aperture 42 in a plug 43 which is threaded in the upper end of the housing 39. The aperture 42 opens into a space 44 into which apertures 45 radially extend through the walls of the housing 39. A plug 46 closes the upper end of the housing 39 and a cap 47 extends over it and downwardly beyond the ends of the apertures 45 which open to the atmosphere. A screw 48 serves to hold the cap 47 in place on the housing 39.

In order to reset the main valve member or disc 18 to the open position after it has been closed automatically as a result of failure of gas pressure, a manually operable reset pin 49 is slidably mounted in the lower wall of the valve housing 11. A stop pin 50 extends transversely through the reset pin 49 and limits its downward movement. The reset pin 49 can be mounted slidably in a sleeve 51 that is threaded into the bottom wall of the valve housing 11. A cap 52 may be threaded onto the lower end of the sleeve 51 to provide a seal around the reset pin 49 and prevent the escape of gas therepast. If desired, a valve seat may be provided at the upper end of the sleeve 51 and a valve member provided on the reset pin 49 in lieu of the stop pin 50 for engaging this valve seat to prevent the escape of gas in the event that the cap 52 should not be replaced.

In operation, it will be assumed that normal gas pressure is available and that gas flows as indicated by the arrows 14 through the opening 16', at which time the main valve member or disc 18 and the diaphragm 19 are in the valve open upper position. The control valve 31 then occupies the position shown in dotted lines, with the valve member 33 in engagement with the lower seat 32, thereby closing the passageway 23. Under these operating conditions the gas pressure in the main space 20 below the diaphragm 19 is sufficient to hold it in the upper position and the main valve member or disc 18 in the valve open position. Since the vent or passageway 37 is open, the auxiliary space 21 above the diaphragm 19 is vented to the atmosphere. So long as sufficient gas pressure is maintained in the main space 20 of the valve housing 11 to hold the diaphragm 19 in this position, the main valve member or disc 18 will be held in the open position.

Now when there is a failure in the gas pressure, such as a reduction in the pressure below the amount necessary to hold the diaphragm 20 in the uppermost position or a complete failure of the gas supply, the diaphragm 19 moves downwardly since it is biased in this direction by the weight of the washers 25 and 26 as well as by the weight of the bolt 22, main valve member or disc 18, washer 27 and nut 28. As the lower seat 32 is moved away from the uppermost position, the valve member 33 moves therewith until further downward movement thereof is prevented by engagement of the valve member 35 with the upper seat 36 of the control valve 31. Thereafter the lower seat 32 moves downwardly away from the valve member 33. Since the vent or passageway 37 now is closed, the auxiliary space 21 above the diaphragm 19 no longer is vented to the atmosphere. Moreover, since the valve member 33 no longer engages the lower seat 32 and the passageway 23 is open, the auxiliary space 21 is in communication with the inlet space 29.

Now it will be assumed that gas pressure is restored so that the normal gas pressure is again present in the inlet space 29. Since the space 29 is in communication through the passageway 23 with the auxiliary space 21, the same pressure is applied to the upper side of the diaphragm 19 that is applied to the underside of the main valve member or disc 18. Since the area of the latter is substantially less than that of the former, as pointed out above, the resultant gas pressure acts in a direction to hold the diaphragm 19 in the position shown in Figure 1 with the main valve member or disc 18 in the closed position. This pressure is in addition to the biasing force exerted by gravity as previously described. It follows that the greater the gas pressure, the more force will be applied to hold the main valve member or disc 18 in the closed position.

From what has been said it will be apparent that the main valve member or disc 18 moves automatically to the closed position on the failure of the gas pressure or its reduction below a predetermined value and that it remains in the closed position on the restoration of gas pressure. Thus, even though gas appliances may be left open and connected to the gas line extending from the outlet 13, gas will not be applied thereto which could escape therethrough as would otherwise be the case if the automatic gas shut-off valve 10 were not provided or if it were arranged so that the restored gas pressure would cause the main valve member or disc 18 to be moved to the open position.

In order to reset the valve 10 to the open position, the cap 52 is removed from the sleeve 51. Thereafter the reset pin 49 is moved upwardly until it engages the lower end of the bolt 22. Its upward movement is continued to lift the main valve member or disc 18 off of the main valve seat 17 and to move the diaphragm 19 to its uppermost position where the valve member 33 is caused to engage the seat 32 and it is moved upwardly to the position shown in Figure 1. The reset pin 49 is released, it moves downwardly to the position shown in Figure 1 and the cap 52 is replaced. The gas pressure maintained in the main space 20 on the underside of the diaphragm 19 serves to hold the main valve member or disc 18 in the open position.

Figure 2:
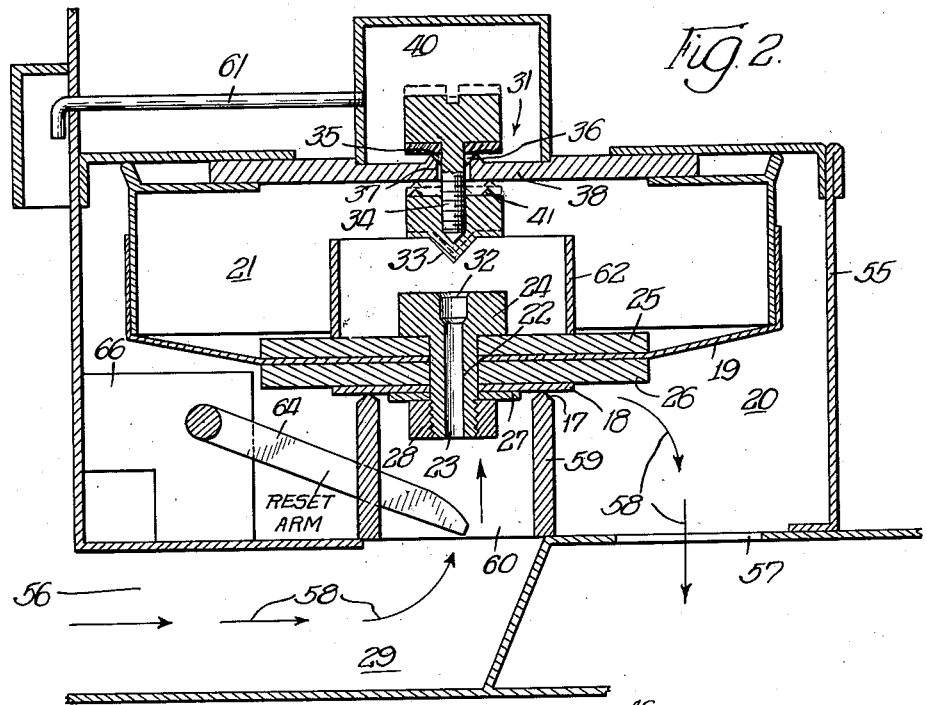
Figure 2 is a view, similar to that shown in Figure 1, and illustrating how the valve construction thereshown can be incorporated in the housing of a gas meter.

In Figure 2 of the drawings, the valve construction 10 previously described is incorporated in a gas meter housing 55 the upper portion of which corresponds to the valve housing 11. In this figure of the drawings the same reference characters are applied to the elements which have the same function as shown in Figure 1 and described hereinbefore.

It will be observed that the gas meter housing 55 has an inlet 56 and an outlet 57 and that the gas flows therethrough as indicated by the arrows 58 when the main valve member or disc 18 is in the open position. The gas flows through a valve seat fitting 59 which is cylindrical and has a cylindrical opening 60 therethrough in which the gas flows as indicated by the arrows 58. The double seated control valve 31 is provided and functions in the manner described.

The space 40 above the control valve 31 is vented to the atmosphere through a tube 61 which, as shown, extends to a position outside of the gas meter housing 55. A sleeve 62 is carried by the washer 25 coaxially with the hollow center bolt 22. When the diaphragm 19 is in its uppermost position and the main valve member or disc 18 is held in the open position, the seat 32 is engaged by the valve member 33 to close off the passageway 23 while the upper edge of the sleeve 62 is juxtaposed to the under side of the plate 38. This insures that the valve member 33 engages properly the lower seat 32 without cocking.

In order to reset the valve 10 once it has closed automatically as a result of failure of gas pressure, a bifurcated reset arm 64 is provided, only one branch of which is shown, for engaging the underside of the main valve member or disc 18 on opposite sides of the bolt 22. The reset arm 64 is rockably mounted in a bracket 66 which may be soldered to the interior of the gas meter housing 55 and is provided with an externally extending arm (not shown) which may be operated, as will be understood readily, to reset the valve 10.

Figure 3:
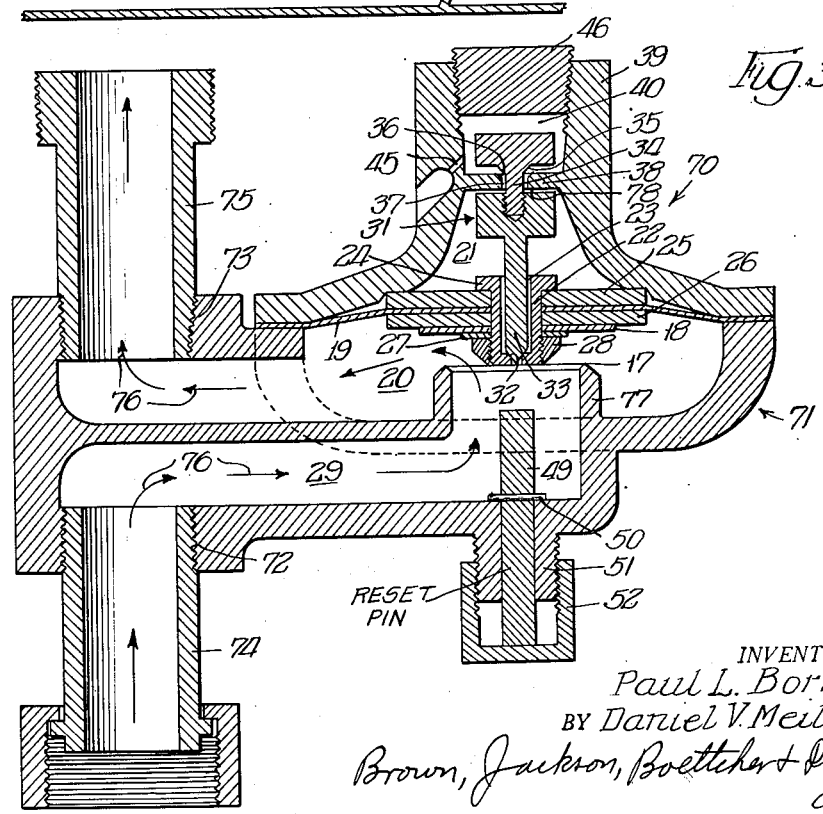
Figure 3 is a vertical sectional view of an automatic gas shut-off valve embodying the features of construction shown in Figure 1 and arranged for insertion in a vertically extending gas line.

Another embodiment of the invention is shown in Figure 3 of the drawings. The automatic gas shut-off valve, which is indicated generally at 70, is generally similar to the valve 10 shown in Figure 1 and described hereinbefore. It includes a housing that is shown, generally, at 71, which corresponds to the housing 11. Insofar as possible the same reference characters have been employed in Figure 3 as were employed in Figure 1 to indicate the parts which perform the same functions in substantially the same manner.

It will be noted that the housing 71 is provided with threaded inlet and outlet ports 72 and 73 into which pipe coupling sleeves 74 and 75, respectively, can be threaded. It will be understood that the sleeves 74 and 75 can be coupled into a vertically extending gas pipe line as may be desired. The arrows 76 indicate the flow of gas through the housing 71 when the main valve member or disc 18 is in the open position.

The housing 71 may be provided with an integrally formed flange 77 which serves the same function as the valve seat fitting 16 shown in Figure 1. At its upper end the flange 77 has the main valve seat 17 which is arranged to be engaged by the main valve member or disc 18.

In the construction shown in Figure 3 the lower seat 32 of the control valve 31 is located at the lower end of the hollow center bolt 22 and at the lower end of the passageway 23 therethrough rather than at the upper end. Accordingly the valve member 33 extends through the passageway 23 so that its conical lower end can engage the valve seat 32 as shown in the drawings.

Also, as shown in Figure 3, the plate 38 is formed integrally with the control valve housing 39 and the plug 46 closes its upper end, the cap 47 being omitted. The aperture 45 which places the space 40 in the valve housing 39 in communication with the atmosphere extends at an angle downwardly, thereby obviating the necessity for the depending cover 47.

The valve 70 shown in Figure 3 functions in the manner described for the valve 10 in Figure 1 to close the passageway through the flange 77 in the event that the gas pressure fails or falls below the value necessary to hold the diaphragm 19 in the position shown. When the main valve member or disc 18 engages the main valve seat 17 to close the valve, the passageway 23 is opened since the valve member 33 can move downwardly only as limited by the extent of movement permitted before the valve member 35 engages the upper seat 36. This closes off the vent 37 to the atmosphere and the auxiliary space 21 is in communication through passageway 23 with the inlet space 29 so that, when the gas pressure is restored, it is applied to the upper side of the diaphragm 19 and serves to hold the main valve member or disc 18 tightly in engagement with the main valve seat 17.

When the valve 70 is in the open position, as shown in Figure 3, the auxiliary space 21 communicates with the atmosphere through the vent 37. This is permitted since radial slots 78 are provided in the upper end of the valve member 33 where it engages the underside of the plate 38.

Instead of providing a separate sleeve 51, as shown in Figure 1, this element can be incorporated as an integral part of the housing 71 with the cap 52 being threaded onto the same.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. An automatic gas shut-off valve comprising, in combination, a valve housing, a diaphragm dividing said housing into a main chamber on one side of said diaphragm and an auxiliary chamber on the other side, said main chamber comprising gas inlet and outlet passageways and a main control port therebetween for controlling gas flow from the inlet to the outlet portion of said main chamber, said auxiliary chamber communicating with the atmosphere through a vent in the wall of said housing, a main valve member carried by said diaphragm to close said main control port, said diaphragm having a passageway therethrough and its main chamber side being acted upon by gas pressure within said main chamber to hold said main valve member in the open position and biased to cause said main valve member to close said main valve part on failure of gas pressure, and a double seated control valve for preventing movement of said diaphragm and main valve member to the open position once they have moved to the closed position on failure of the gas pressure, one of the seats of said control valve being located in said diaphragm passageway and the other in said atmospheric vent, said double seated control valve comprising conjointly movable valve members cooperating with said control valve seats, one engaging said valve seat in said diaphragm passageway when said diaphragm and main valve member are held in the open position to close said diaphragm passageway while said auxiliary chamber is vented to the atmosphere through said vent, and the other engaging said valve seat in said atmospheric vent on failure of the gas pressure, whereby on return of gas pressure the same is applied in said valve housing and through said diaphragm passageway to the auxiliary chamber side of said diaphragm to hold it and said main valve member in the closed position.

2. The invention, as set forth in claim 1, wherein manually operable reset means is provided for resetting the diaphragm and main valve member to their open positions.

3. An automatic gas shut-off valve comprising, in combination, a valve housing, a diaphragm dividing said housing into a main chamber on one side of said diaphragm and an auxiliary chamber on the other side, said main chamber comprising gas inlet and outlet passageways and a main control port therebetween for controlling gas flow from the inlet to the outlet portion of said main chamber, said auxiliary chamber communicating with the atmosphere through a vent in the wall of said housing, a main valve member carried by said diaphragm to close said main control port, said diaphragm having a passageway therethrough placing said auxiliary chamber in communication with the inlet portion of said main chamber when said main valve member is in the closed position and its main chamber side being acted upon by gas pressure within said main chamber to hold said main valve member in the open position and biased to cause said main valve member to engage said main valve port on failure of gas pressure, said passageway registering with said atmospheric vent, a double seated control valve for preventing movement of said diaphragm and main valve member to the open position once they have moved to the closed position on failure of the gas pressure, one of the seats of said control valve being located in said diaphragm passageway and the other in said atmospheric vent, said double seated control valve comprising conjointly movable valve members positioned in tandem and cooperating with said control valve seats, one engaging said valve seat in said diaphragm passageway when said diaphragm and main valve member are held in the open position to close said passageway while said auxiliary chamber is vented to the atmosphere through said vent, and the other engaging said valve seat in said vent on failure of the gas pressure, whereby on return of gas pressure the same is applied through said diaphragm passageway and said auxiliary chamber to the auxiliary chamber side of said diaphragm to hold it and said main valve member in the closed position, and manually operable means for resetting said diaphragm and main valve member to the open position.

4. An automatic gas shut-off valve comprising, in combination, a valve housing, a diaphragm dividing said housing into a main chamber on one side of said diaphragm and an auxiliary chamber on the other side, said main chamber comprising gas inlet and outlet passageways and a main control port therebetween for controlling gas flow from the inlet to the outlet portion of said main chamber, said auxiliary chamber communicating with the atmosphere through a vent in the wall of said housing, a main valve member carried by said diaphragm to close said main control port, said diaphragm having a passageway therethrough and its main chamber side being acted upon by gas pressure within said main chamber to hold said main valve member in the open position and biased to cause said main valve member to engage said main control port on failure of gas pressure, said diaphragm passageway registering with said atmospheric vent, a double seated control valve for preventing movement of said diaphragm and main valve member to the open position once they have moved to the closed position on failure of the gas pressure, one of the seats of said control valve being located in said diaphragm passageway and the other in said atmospheric vent, said double seated control valve comprising tandem positioned valve members conjointly movable as a result of movement of said diaphragm, said valve members cooperating with said control valve seats, one engaging said valve seat in said passageway when said diaphragm and main valve member are held in the open position to close said passageway while said auxiliary chamber is vented to the atmosphere through said vent, and the other engaging said valve seat in said vent on failure of the gas pressure, whereby on return of gas pressure the same is applied in said valve housing and through said diaphragm passageway to the auxiliary chamber side of said diaphragm to hold it and said main valve member in the closed position, and manually operable means for resetting said diaphragm and main valve member to the open position.

5. An automatic gas shut-off valve comprising, in combination, a valve housing, a horizontally extending diaphragm dividing said housing into a lower main chamber and an upper auxiliary chamber, said lower main chamber comprising gas inlet and outlet passageways and a main control port therebetween for controlling gas flow from the inlet to the outlet portion of said main chamber, said upper auxiliary chamber communicating with the atmosphere through a vent in the wall of said housing, a main valve member carried by said diaphragm to close said main control port, said diaphragm having a passageway therethrough and its under side being acted upon by gas pressure within said main chamber to hold said main valve member in the open position and biased by gravity to cause said main valve member to engage said main control port on failure of gas pressure, a double seated control valve for preventing movement of said diaphragm and main valve member to the open position once they have moved to the closed position on failure of the gas pressure, one of the seats of said control valve being located in said diaphragm passageway and the other in said atmospheric vent, said double seated control valve comprising valve members conjointly movable in a vertical direction and cooperating with said control valve seats, one engaging said valve seat in said passageway when said diaphragm and main valve member are held in the open position to close said diaphragm passageway while said auxiliary space is vented to the atmosphere through said vent, and the other being biased by gravity to engage said valve seat in said vent on failure of the gas pressure, whereby on return of gas pressure the same is applied in said valve housing and through said diaphragm passageway to the upper side of said diaphragm to hold it and said main valve member in the closed position, and manually operable means for moving said diaphragm and main valve member upwardly to the open position and for moving therewith said control valve members to close said passageway and open said vent.

6. The invention, as set forth in claim 5, wherein the manually operable reset means comprises a pin slidably mounted in the valve housing and means are provided for preventing the escape of gas past said pin.

7. The invention, as set forth in claim 5, wherein the manually operable reset means comprises a rockably mounted arm.

8. An automatic gas shut-off valve comprising, in combination, a valve housing, a horizontally extending diaphragm dividing said housing into a lower main chamber and an upper auxiliary chamber, said lower main chamber comprising gas inlet and outlet connections and a horizontally disposed main control port therebetween for controlling gas flow from the inlet to the outlet portion of said main chamber, said main control port comprising a main valve seat having a substantially vertical axis, a main valve member on the under side of said diaphragm for engaging said main valve seat to close said control port, a bolt having an axial passageway therethrough extending through said diaphragm and main valve member to secure the same together, the underside of said diaphragm being acted upon by gas pressure within said main chamber to hold said main valve member in the open position and biased by gravity to cause said main valve member to engage said main valve seat on failure of gas pressure; a control valve housing extending upwardly from said valve housing, communicating with the atmosphere, opening into said auxiliary chamber, and having a vertically extending vent therebetween registering with said passageway; a double seated control valve for preventing movement of said diaphragm and main valve member to the open position once they have moved to the closed position on failure of the gas pressure, one of the seats of said control valve being located in said passageway and the other in said vent, and a pair of rigidly connected valve members one below the other cooperating with said valve seats, said one valve member engaging said valve seat in said passageway when said diaphragm and main valve member are held in the open position to close said passageway while said auxiliary space is vented to the atmosphere through said vent and said other valve member being biased by gravity to engage said valve seat in said vent on failure of the gas pressure whereby on return of gas pressure the same is applied in said valve housing and through said passageway to the upper side of said diaphragm to hold it and said main valve member in the closed position.

9. The invention, as set forth in claim 8, wherein the inlet and outlet openings of the valve housing are located in about the same horizontal plane.

10. The invention, as set forth in claim 8, wherein the inlet and outlet openings of the valve housing communicate respectively with the main chamber from underneath and above.

11. The invention, as set forth in claim 8, wherein reset means are operable externally of the valve housing for operatively engaging the lower side of the diaphragm to restore the main valve member to the open position and the control valve members to their corresponding positions.

12. The invention, as set forth in claim 11, wherein the reset means comprises a pin slidably mounted in the valve housing and sealing means cooperates therewith for preventing the escape of gas therepast.

13. An automatic gas shut-off valve comprising, in combination, a valve housing, a diaphragm dividing said housing into a main chamber on one side of said diaphragm and an auxiliary chamber on the other side, said main chamber comprising gas inlet and outlet passageways and a main control port therebetween for controlling gas flow from the inlet to the outlet portion of said main chamber, an atmospheric vent normally connecting said auxiliary chamber with atmosphere, a pressure transmitting passageway for transmitting gas pressure from the inlet portion of said main chamber to said auxiliary chamber, a main valve member carried by said diaphragm operative to close said main control port in the performance of a gas shut-off function, and auxiliary valve means for controlling said atmospheric vent and said pressure transmitting passageway whereby in the normal position of the parts the atmospheric vent is open and the pressure transmitting passageway is closed, with the main valve member separated from said main control port, and whereby in the shut-off position of the parts said atmospheric vent is closed and said pressure transmitting passageway is opened, with the main valve member closing said main control port, so that when pressure is resumed in the inlet portion of said main chamber such pressure will be transmitted through said pressure transmitting passageway to said auxiliary chamber for holding said main valve member closed against said main control port, said diaphragm and main valve member being capable of movement independently of said auxiliary valve means.

PAUL L. BORN.
DANIEL V. MEILLER.

REFERENCES CITED

The following references are of record in the file of this patent:

UNITED STATES PATENTS

| Number | Name | Date |
|---|---|---|
| 374,485 | McGann | Dec. 6, 1887 |
| 1,099,619 | Rutten | June 9, 1914 |
| 1,619,130 | Jones | Mar. 1, 1927 |
| 1,703,570 | Borck | Feb. 26, 1929 |
| 1,756,340 | Bryant | Apr. 29, 1930 |
| 2,050,562 | DeLawter | Aug. 11, 1936 |

FOREIGN PATENTS

| Number | Country | Date |
|---|---|---|
| 462,762 | Great Britain | of 1935 |
| 605,303 | Germany | of 1935 |